United States Patent

[11] 3,594,718

[72] Inventors Charles I. Black;
 Ralph M. DuVall, both of Dallas, Tex.
[21] Appl. No. 606,210
[22] Filed Dec. 30, 1966
[45] Patented July 20, 1971
[73] Assignee Texas Instruments Incorporated
 Dallas, Tex.

[54] SHIFT REGISTER TIME COMPRESSOR FOR SONAR SIGNAL CORRELATION
 7 Claims, 3 Drawing Figs.
[52] U.S. Cl. .................................................. 340/6 R,
 343/100 CL
[51] Int. Cl. .................................................. G01s 3/00
[50] Field of Search .................................... 340/6, 16;
 343/100.7, 113

[56] References Cited
UNITED STATES PATENTS
3,182,283  5/1965  Ellingson et al. ............. 340/6

*Primary Examiner*—Richard A. Farley
*Attorneys*—James O. Dixon, Andrew M. Hassell, Harold Levine, Rene' E. Grossman, Richards, Harris & Hubbard and V. Bryan Medlock, Jr.

ABSTRACT: Successive signal samples from one detecting station are each compared for polarity coincidence with all samples in a train of samples of signals from a second detecting station with visual display means provided for integration with time. New samples of signals from both detecting stations are injected into the system at controlled sample rates synchronized with the display unit.

INVENTORS:
CHARLES I. BLACK
RALPH M. DuVALL

ATTORNEY

INVENTORS:
CHARLES I. BLACK
RALPH M. DuVALL

ATTORNEY

SHIFT REGISTER TIME COMPRESSOR FOR SONAR SIGNAL CORRELATION

FIELD OF THE INVENTION

This invention is directed to sonar operations and more particularly to sensing the bearing of a source, energy from which is detected at a pair of listening stations, by use of an indicating system including a shift register controlled for simplified continuous cross correlation of two signals.

DESCRIPTION OF THE PRIOR ART

Correlation detectors heretofore have been found to be effective for detecting signals contaminated by noise. In antisubmarine warfare, it is frequently necessary to detect and localize submarine targets. A common means now used involves two or more spaced hydrophones to produce signals which are then cross correlated. Since submarines transmit sound fields that possess a broad band structure, cross correlation has been found to be effective in determining the presence and bearing of such radiated signals. This type of correlation detection is commonly referred to as Codar or, more fully stated, correlation detection analyzer recorder. In the past, both analog- and digital-type systems have been employed to perform this system.

Most of the real-time digital correlators make use of the fact that the correlation function between two functions $f_1(t)$ and $f_2(t)$ can be represented by a summation and averaging of a large number of discrete multiplications, where sampled values of $f_1(t)$ and $f_2(t)$ are delayed relative to one another by $\tau$ seconds, rather than continuous time functions which are delayed and stored. This means that the mathematical definition of the correlation function becomes approximated by $$\phi_{AB}(\tau) = \frac{1}{N} \sum_{i=0}^{N} A_i B_{i+j} \qquad (1)$$

This requires that a variable artificial time delay $\tau$ be introduced into one function. To shorten the time spent in computing the correlation function over a number of time delays, multiple-processing or speedup techniques are normally employed. One may use a number of correlators in parallel timewise, operating simultaneously but each using input functions $f_1(t)$ and $f_2(t)$ with different relative time delays. The disadvantage of this approach is the large amount of equipment required.

It is also possible to speed up the incoming signals and thereby search more rapidly with a single correlator. A delay line memory, using an ultrasonic delay line, provides one means of accomplishing the signal speedup. In such system, described in U.S. Pat. No. 2,958,039, and known as the Deltic (DElay Line TIme Compressor), the incoming information is stored in time compressed form for a predetermined length of time. During this time, the information in storage is read out many times at high speed. Between each read out, part of the signals which were received and stored first is being continually updated in time. With this time compression feature, it is possible to compute correlation functions between two signals over a range of time delay values on a real-time basis.

Most of the advanced systems for performing the Codar function are done with Deltics or their equivalent as the central processing block and perform the required computations in the conventional manner as given by Equation (1).

SUMMARY OF THE INVENTION

In accordance with the present invention, sound fields are detected at two locations to produce two signals A and B which are then continuously cross correlated by cycling clipped polarity indicating samples of signal A through a delay register at a high rate while storing similar samples of signal B at a lower rate and continuously comparing polarities of the stored sample and the circulating samples, with a new sample being introduced into the register in synchronism with each new sample from the signal B. The oldest sample signals are discarded as each new sample is introduced.

DESCRIPTION OF THE DRAWINGS

For a more complete understanding of the present invention and for further objects and advantages thereof, reference may now be had to the following description taken in conjunction with the accompanying drawings in which.

DESCRIPTION OF THE PREFERRED EMBODIMENTS

Figure 1:
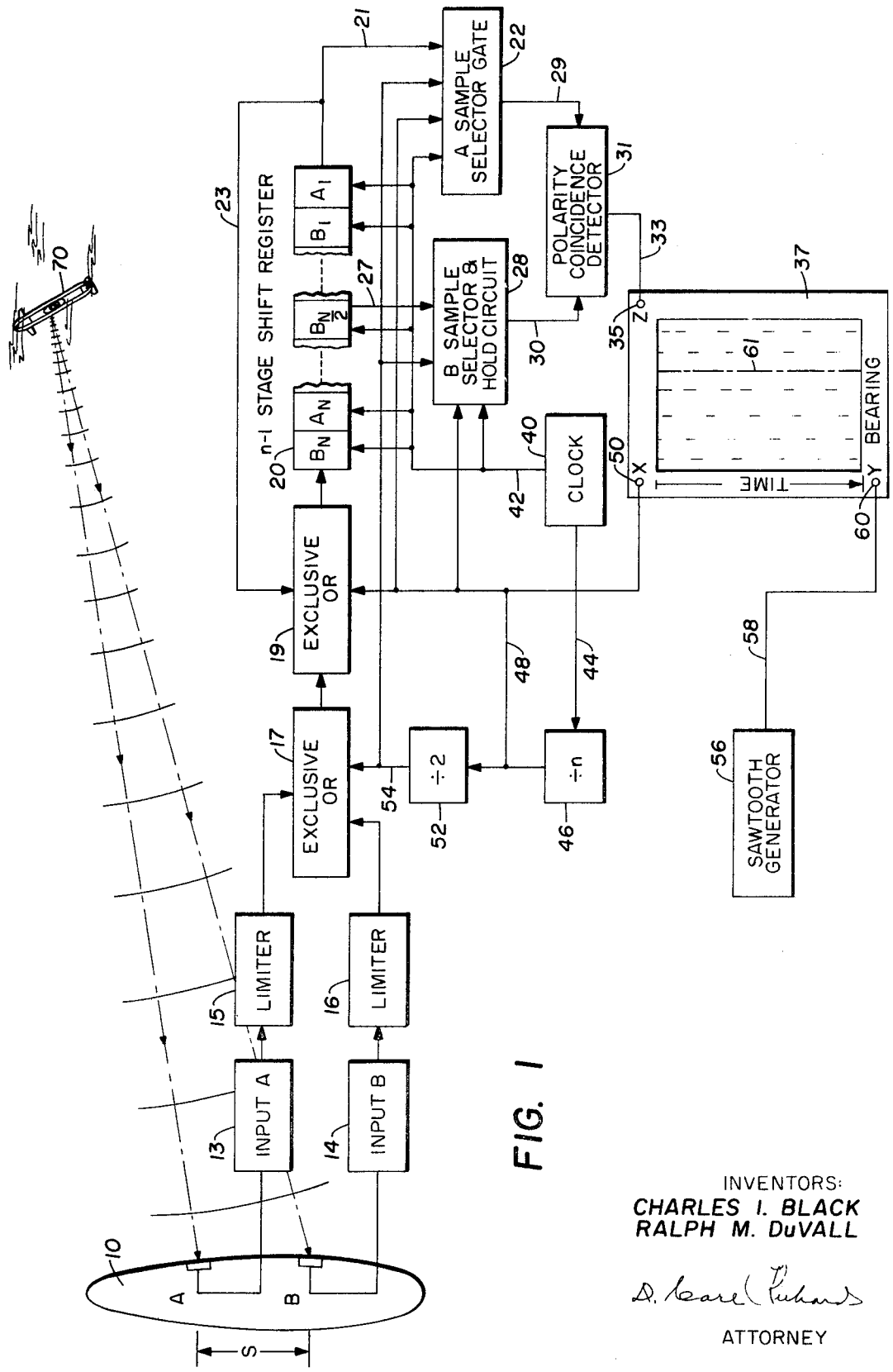
FIG. 1 is a circuit diagram illustrating the present invention and its operation.

Referring now to FIG. 1, a vessel 10 is provided with listening devices A and B. The detectors A and B may be connected through suitable amplifying means 13 and 14, respectively. The output of amplifier 13 is connected by way of a limiter 15 to an exclusive OR circuit 17. Similarly, amplifier 14 is connected to the exclusive OR circuit 17 by way of a limiter 16.

The output of exclusive OR unit 17 is connected to an exclusive OR unit 19 whose output in turn is connected to a multistage shift register 20. The shift register 20 has $n-1$ stages. The output of the last stage $A_1$ is connected by way of channel 21 to an A sample selector gate 22. The output stage $A_1$ is also connected by way of conductor 23 to an input to the exclusive OR unit 19. A central register $B_{N/2}$ is connected by way of conductor 27 to a B sample selector and hold circuit 28. The outputs of the A and B sample units 22 and 28 are connected by way of conductors 29 and 30, respectively, to the inputs of a polarity coincidence detector 31. The output of the detector 31 is connected by way of channel 33 to the intensity (Z) modulation terminal 35 of a cathode-ray tube or storage tube display unit 37.

A clock pulse source 40 produces output pulses at a desired clock rate. The pulses at such rate are applied by way of channel 42 to the A and B sample units 22 and 28 and to each stage in register 20. Clock pulses are applied by way of channel 44 to a pulse dividing unit 46 where the clock pulse rate is divided by a factor of $n$. Pulses at the latter rate are then applied by way of channel 48 to the X deflection gate terminal 50 of the display unit 37, to a second gate input on each of the A and B sample units 22 and 28, and to put an input to the exclusive OR unit 19.

Clock pulses at the rate appearing on conductor 48 are also applied to a divide-by-two unit 52. The output of unit 52 appearing on channel 54 is applied to one input of the exclusive OR unit 17 and to one input of each of the A and B sample units 22 and 28.

A saw-toothed wave generator 56 is connected by way of channel 58 to the Y or vertical deflection gate terminal 60 of the unit 37.

The detectors A and B on the vessel 10 serve to detect any signal such as may emanate from a submarine 70 or other source, the identification of which is sought. It is the bearing from the listening station to the submarine 70 that is here determined. However, this is rendered difficult since detectors A and B detect not only the signal from submarine 70 but also all ambient or background noise.

This system makes use of the shift register 20 of $n-1$ stages as a delay line to achieve a Delticlike operation. However, no electronic averaging or integration is required as this is obtained on the display. By removing this restriction, the present invention offers more flexibility in terms of selecting system design parameters while requiring less electronic circuitry.

In operation, two channels of information are applied to inputs A and B. The signals from each channel are infinitely clipped and applied to exclusive OR sample gate 17. A basic clock operating at $fc$ c.p.s. is counted down by $n$ in unit 46 and $2n$ in unit 52 to generate the basic sampling pulses. The sample pulse derived from the 2n countdown stage 52 is used to take alternate data samples from channels A and B. These samples are then input to the second exclusive OR data insertion gate 19. Input data samples are inserted into the delay line every n clock periods and coincident with the n sample pulse. At all other times, the data samples at the output of the delay line are reinserted back into the line by way of channel 23.

Since the line is one clock period shorter than the period at which data samples are being taken, the nth data sample inserted into the line will arrive back at the insertion gate at the same time that a new data sample is being taken and will be rejected. From then on, each recirculation period removes the oldest data sample and replaces it with a new data sample. During the recirculation period (n clock periods), all stored samples from channel A and B will appear at the output 21 of the delay line. Outputs are taken at the end 21 of the line and at the middle 27. The data samples emerging at the end of the line are input to the A sample selector gate 22. The purpose of this gate is to select only samples originating from channel A and pass them to the polarity coincidence detector 31. The other inputs to the gate are ANDed clock pulses at rates $fc$, $fc/n$, and $fc/2n$ to insure that only A channel data samples are passed while rejecting the B channel data samples.

The data samples emerging from the middle of the line on channel 27 are the same as those emerging from the end of the line except for a relative time delay. To simplify the logic required, the line is made an equal number of delay elements; that is, $n-1$ preferably is an even number of stages. The tap at the middle of the line is then placed at $(n-1/2) \pm 1$ delay elements from the end.

The data samples emerging on channel 27 are input to the B sample selector and hold circuit 28. The purpose of this circuit is to select a B channel data sample every $2n$ clock periods and coincident with the $2n$ sample pulse. Since the data samples in the line advance one clock period each $n$ clock periods, this will insure that a B data sample is available at the tap every $2n$ clock periods. Thus, every $2n$ clock periods the next adjacent B channel data sample is selected. The polarity of this data sample is then held at the same state by the hold circuit 28 for $2n$ clock periods at which time the next adjacent B sample is selected and the hold circuit assumes its polarity (either zero or 1).

In the polarity coincidence detector 31, the selector B data sample is compared with all the A channel data samples during a recirculation period (time between which input data samples are taken or $n$ clock periods). The comparison between a B data sample and all A data samples need be performed and displayed only every other recirculation period. Every other recirculation period a new B data sample is selected and compared with all the A data samples. The effect of this is to produce at the output of the polarity coincidence detector a rapid delay or bearing scan. The polarity coincidence detector 31 gives an output only when the B data sample polarity is the same as the A data samples.

In a typical data readout which is presented to the polarity coincidence detector, the B data sample is taken at time $t$ N/2 and is compared with all stored A data samples taken at time zero. $l$, $t_2,...t$ N/2...tN. The A data sample taken at time $t_1$ is compared with the B data sample taken at a later time $tN/2$ and represents a relative time delay of about N·$n/fc$ seconds. At the middle of the comparison period, data sample A which was taken at time $t$ N/2 is compared with the B data sample taken at essentially time $t$ N/2 also. Thus, this represents a relative delay of zero. At the end of the comparison period, the relative delay between the two compared data samples are the same as the first two samples compared but in the opposite time delay direction.

On the next comparison period (which starts $2n$ clock periods from the first), data sample $A_1$ and $B_1$ will have been removed and replaced with new data samples $A_{N+1}$ and $B_{N+1}$. Data sample B (N+1/2) will be selected, stored in unit 28, and compared with all the A data samples.

It can be seen that the relative time delay between the compared bits remain the same at each position during the comparison period but is performed with new data. Thus, a constant time delay scan is achieved in $n$ clock periods starting every $2n$ clock periods. If the compared bits at any one time delay value were averaged from one comparison period to another and over a period T seconds, the result would be equivalent to $$\phi_{AB}(\tau_j) = \frac{1}{N} \sum_{i=1}^{N} A_i B_{i+j} \qquad (2)$$

This represents one point on the correlation function with a lag value $t_j$. Proceeding along a comparison point, $t_j$ varies from $\tau N/2$ through zero to $-\tau N/2$. Thus, the correlation between two input functions is obtained over a $\pm \tau N/2$ time delay range while the number of comparison periods determines the effective integration time T. However, no electronic integration is needed as this is obtained on the display.

By intensity modulating a CRT or storage tube unit 37 with the output of the polarity coincidence which is scanned horizontally at the input channel sampling rate and vertically at some suitable slower rate, a time vs. bearing scan or Codargram can be generated similar to that shown in FIG. 1 on unit 37.

With this invention, the intensity of the writing is either on or off. A target signal will show as a vertical alignment 61 of equal intensity marks at the proper bearing, while noise will appear as a random scatter of equal intensity marks. The effective integration time can be achieved by line or visual integration. Line integration can be achieved by overlapping several horizontal scans on the face of the tube while visual integration can be achieved by displaying successive horizontal scans in the side-by-side presentation. The two integration methods can be proportioned in any given ration and changed at will.

This invention has several major advantages over conventional techniques. The more important of these include elimination of electronic integration limitations imposed on conventional systems, it permits better design parameter compromises, and it is simpler to implement.

One of the basic limitations of conventional systems is due to the electronic integration time employed. Long integration times are needed to detect weak target signals in noise. Conventional systems usually employ a combination of electronic and visual integration. The electronic integration is fixed at some predetermined time and the display used to extend the effective integration time by visual means. However, it is the electronic integration time rather than visual integration that limits its detection performance. In general, there is no limit on the electronic integration time that can be used if the target signal and bearing are stable and constant. However, detection will be degraded if the resolved target bearing changes during the integration period. This invention eliminates the electronic integration restriction by replacing it with visual integration.

By removing the electronic integration time restriction, more flexibility is afforded in selecting system design parameters. For example, the choice of electronic integration time and system bandwidth for conventional systems is in direct conflict with the hydrophone base line steering capability. This invention removes the electronic integration time conflict and therefore permits better compromises between base line and bandwidth.

From an instrumentation standpoint, the present system is much simpler to implement than conventional systems. It requires the use of one shift register time compressor compared to a minimum of two for conventional systems, offers more capability with shorter storage times while eliminating the low-pass integration filters. It does, however, require the use of a rapid writing capability for displaying the information.

In one embodiment, a 500-bit shift register was employed. The correlator was built using semiconductor networks which require that the logic functions of the input signals be "0"

volts or "5" volts. Since the correlator made use of only polarity information, the signals to be correlated were first infinitely clipped. The output levels assumed either "0" or "5" volts, depending on the polarity of the input signals. The networks were of Series 74 Integrated Circuits, manufactured and sold by Texas Instruments Incorporated, Dallas, Tex.

The correlated output was displayed on an oscilloscope an intensity modulation which scanned horizontally at the input sampling rate and vertically at a suitable slower rate. The CRT was photographed to obtain permanent records and to achieve a desired integration time.

Figure 2:
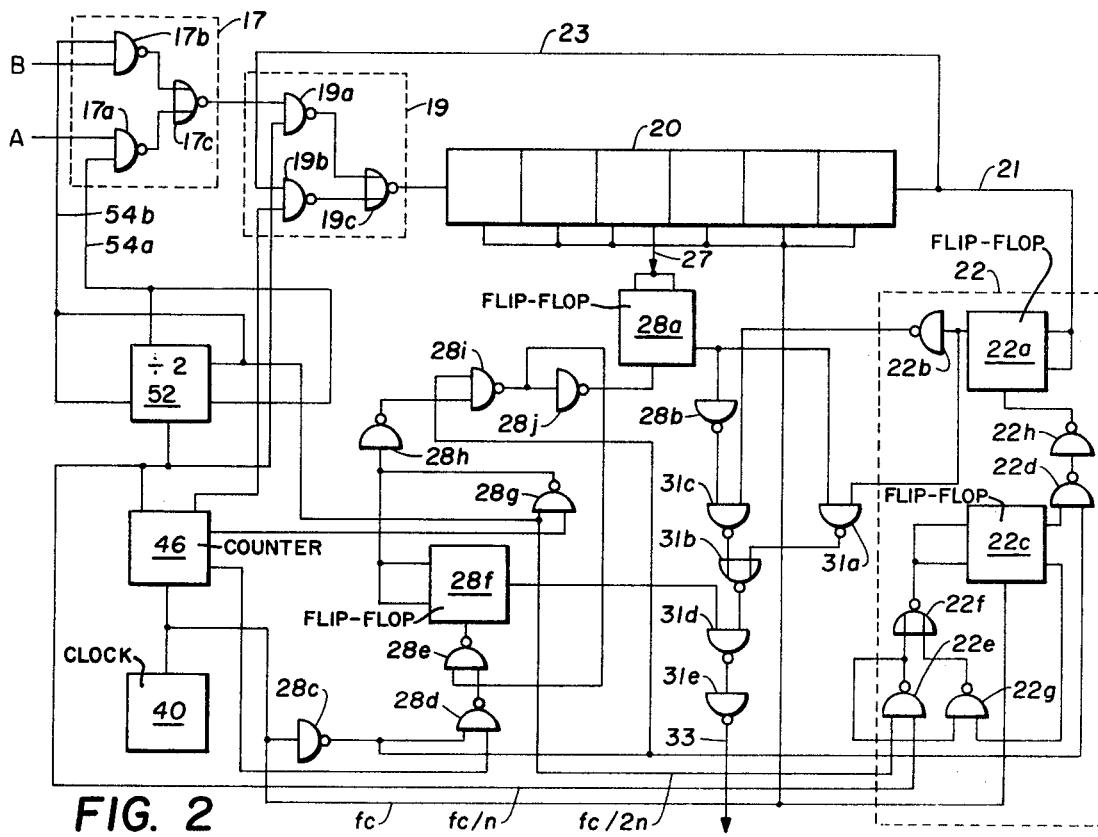
FIG. 2 is a more detailed logic circuit of a portion of the system of FIG. 1.

In FIG. 2, a more detailed logic diagram has been illustrated to show the relationship between the elements of the system of FIG. 1.

The exclusive OR gate 17 includes NAND gates 17a, 17b, and NOR gate 17c. Input A is applied to NAND gate 17a and input B is applied to NAND gate 17b. The outputs of gates 17a and 17b are NORed in gate 17c. The output of the divide-by-two unit 52 is connected by way of channel 54a to NAND gate 17a. The complement of the output from the counter 52 is connected by way of channel 54b to the NAND gate 17b.

Exclusive OR gate 19 includes NAND gates 19a, 19b, and NOR gate 19c. The output of gate 17c and the output of unit 46 are applied to gate 19a. The recirculating data on channel 23 is applied, along with the complement of the output of counter 46, to NAND gate 19b. The output of gates 19b and 19a are NORed in the gate 19c.

In the A sample selector gate 22, channel 21 leads to a flip-flop 22a, the output of which is inverted by unit 22b. The output of 22a also leads to one input of NAND gate 31a whose output is fed to a NOR gate 31b. The clock pulses are applied at a rate of $fc$ to a second flip-flop 22c with the complement of the clock pulses being applied to a NAND gate 22d. Clock pulses at the rate of $fc/n$ are applied from unit 46, to a NAND gate 22e and pulses from unit 52 at the rate of $fc/2n$ are also applied to NAND gate 22e. The output of NAND gate 22e is applied to one input to a NOR gate 22f whose output is applied to the flip-flop 22c. The output of gate 22e is also applied to one input of a NAND gate 22g, the second input of which is derived from the flip-flop 22c. Flip-flop 22c also supplies a second input to NAND gate 22d, the output of which is inverted in unit 22h and applied to flip-flop 22a.

The output of gate 22b is applied to one input of the gate 31c, whose output in turn is connected to the second input of gate 31b. The output gate 31d and inverter 31e supply the signal on channel 33. The latter leads to the intensity modulation terminal 35 of display unit 37, previously described (FIG. 1).

The intermediate sample is selected on channel 27 and is applied to a flip-flop 28a. One output of the flip-flop 28a is applied to an inverter 28b, whose output in turn feeds the second input to gate 31c. The same output from the flip-flop 28a supplies a second input to gate 31a.

Clock pulses at rate $fc$ are applied to the unit 28 by way of inverter 28c which supplies one input of a gate 28d, the other input of which is supplied from the output of counter 46. The output of gate 28d supplies one input of NAND gate 28e, the output of which is connected to a flip-flop 28f. The output of flip-flop 28f is supplied to the second input of NOR gate 31d. Clock pulses at the rate of $fc/n$ are applied to one input of a NAND gate 28g, the second input of which is supplied from counter 52 at the rate of $fc/2n$. The output of gate 28g is supplied to the input of flip-flop 28f and to an inverter 28h, the output from which is connected to one input of a NAND gate 28i. The second input of gate 28i is supplied with clock pulses from the output of gate 28c. The output of gate 28i is the second input of gate 28e and an inverter 28j, the output of which is connected to the flip-flop 28a.

The foregoing circuit will be found to be a more detailed representation of the system shown in block form in FIG. 1. It offers great flexibility in the time delay desired for correlation purposes. All that is necessary is first to select the number of stages in the register 20 and then suitably select the pulse rates as above specified.

It will be appreciated that the time delay involved preferably will be at least equal to twice the time required for sound waves to travel the distance S, the spacing between the detectors A and B.

Further, it will be noted that reference has been made to selecting the B sample from the center of the shift register 20. This permits scanning in azimuth over 180°. However, where it is desired only to scan a less portion of the search zone, such as, for example, only one quadrant, then the B sample could be selected from the stage at one end of the shift register. It would be selected from one end of the shift register 20 if it is desired to scan a forward quadrant. It would be selected from the other end if desired to scan the rear quadrant.

In the system illustrated in FIG. 1, data samples from the outputs of detectors A and B are alternately sampled and injected as an interlaced train A and B samples in the register 20. It will be appreciated that alternate sampling is not a necessary requirement. It is preferred, however, since a single shift register is required. In the case where two registers are employed, alternate sampling is not necessary, while the same beneficial results as above-described are achieved.

Figure 3:
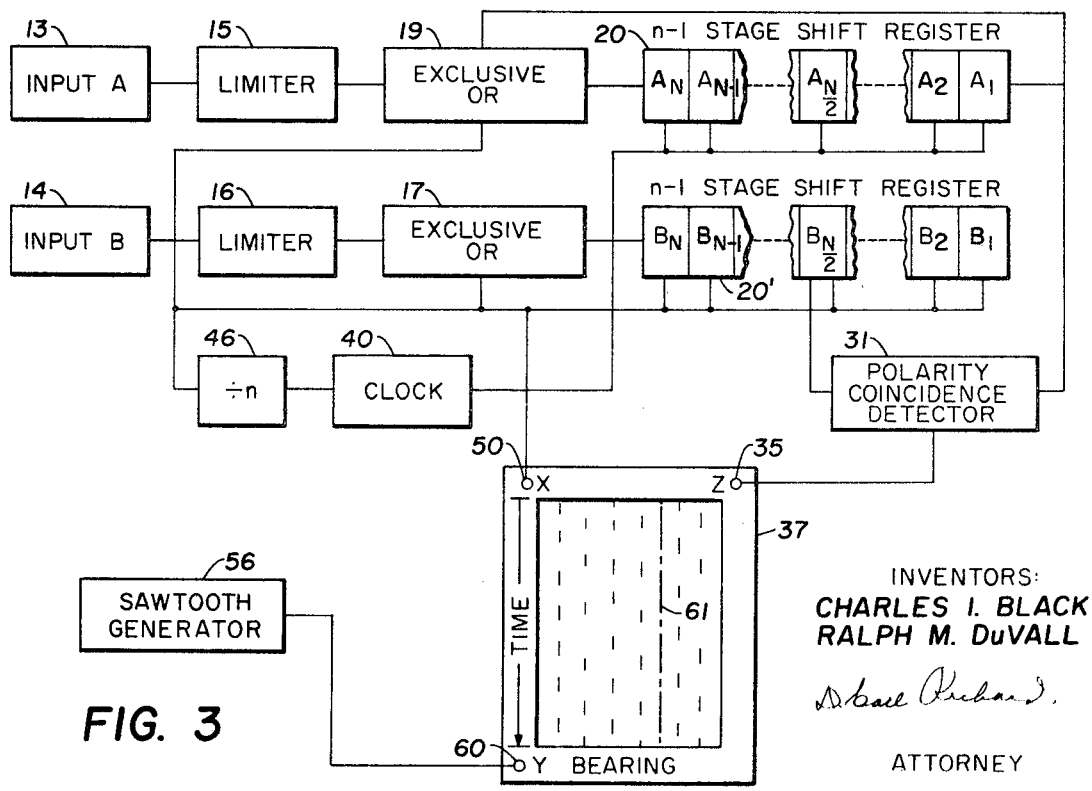
FIG. 3 is a modification of the system of FIG. 1.

A system which does not require alternate sampling is illustrated in FIG. 3. In this system, the same reference characters have been applied to parts which correspond with those parts in FIG. 1. In this system, the A sample values are applied to a shift register 20 having $n-1$ stages. The B sample values are applied to second shift register 20' also having $n-1$ stages. In this system, the clock pulses are applied at the rate $fc$ to the register 20. They are applied at the rate $fc/n$ to the register 20'. The output of the register 20 is applied to the polarity coincidence detector 31. Any one of the stages from register 20' may be applied to the second input of the coincidence detector 31. Preferably it will be selected from the center stage in order to provide scanned capabilities through the 180°.

What we claim is:

1. A sonar data correlator which comprises:
  a. a pair of spaced sonar receivers A and B having amplitude limiters connected thereto,
  b. a clock pulse source for producing pulses at the rate $fc$ pulses per second,
  c. sampling means responsive to pulses from said source for sampling the polarity of signals from said receivers at the rate $fc/2n$,
  d. a shift register means for storing the samples from said sampling means and having $n-1$ stages and a recirculating loop,
  e. sample and hold means for providing reference samples of the signal from the first of said receivers at a first rate proportional to $fc/2n$ and for extracting samples of the signal from the second of said receivers from the last stage of said register means at a second rate proportional to $fc/2$,
  f. means to apply clock rate pulses to each stage of said register means to move said samples therethrough,
  g. a rapid writing display unit having a sweep triggered at intervals equal to $n$ clock periods, and
  h. a polarity coincidence detector connected at one input to said last stage of said register means to receive A sample signals at said first rate, at the other input to receive B sample signals at said second rate, and at its output to the intensity modulation terminal of said display unit.

2. The combination of claim 1 wherein said register means comprises a single register with A and B samples interlaced therein and wherein a sample and hold unit is actuated to extract and hold B sample signals from a selected stage at said first rate for application to said detector.

3. The combination of claim 1 wherein said register means comprises two registers, one of which receives A sample signals and the other of which receives B sample signals.

4. A sonar data correlator which comprises:
  a. a pair of spaced sonar receivers A and B having amplitude limiters connected thereto,
  b. a clock pulse source for producing pulses at the rate of $fc$ pulses per second, c. sampling means responsive to a pulses from said source for alternately sampling the polarity of signals from said receivers at a $fc/2n$ rate, d. a shift register for storing the samples from said sampling means and having $n-1$ stages and a recirculating loop, e. sample and hold means for extracting and storing B sample signals from the receiver B a selected stage in said register at a $fc/2n$ rate, f. means to apply clock pulses at the rate $fc$ to each stage of said register to move said samples therethrough and extract A sample signals from receiver A from the last stage of said register at the rate of $fc/2$, g. a rapid writing display unit having a sweep triggered at intervals equal to $n$ clock periods, and h. a polarity coincidence detector connected at one input to said last stage, at the other input to said sample and hold means, and at its output to the intensity modulation terminal of said display unit.

5. In a sonar system where acoustic energy from a source of unknown bearing is sensed at two spaced apart detecting stations, the combination which comprises:

a. a pair of exclusive OR units, the first of which is connected to the second, b. a limiter connected between the first detecting station and the first exclusive OR unit, c. a limiter connected between the second detecting station and the first exclusive OR unit, d. a shift register of $n-1$ stages having an input connected to the second exclusive OR unit and a recirculating loop leading to said second exclusive OR unit, e. a sample selector gate connected to the last stage of said shift register, f. a sample selector and hold unit connected at one input to an intermediate stage of said shift register, g. a display unit having an intensity control input and a sweep input, h. clock means for applying pulses at the rate $fc$ to all stages of said register, at the rate $fc/n$ to said sample and hold unit, at the rate $fc/2n$ to said first exclusive OR unit and to said sample selector gate, at the rate $fc/n$ to said second exclusive OR unit and to said sweep input, and i. a polarity coincidence detector connected at its inputs to said sample selector gate and to said sample selector and hold unit and at its output to said intensity control input.

6. The method of scanning in azimuth with a sonar system having two receivers A and B, which comprises:

a. passing polarity indicating time spaced samples of signals from receivers A and B through an $fc$/stage n, register means at a step rate $fc$, b. adding new samples to said series from said receivers A and B at the rate of $fc/2n$, c. sampling a B sample signal from one stage of said register means at the rate $fc/2n$ and holding the same, d. establishing a series of output conditions representative of polarity coincidence between said B sample signal and A sample signals appearing at the output portion of said shift register means at the rate $fc/2$, and e. visually displaying said condition on a repetitive time base having a period of $n/fc$ to provide an integration of the coincidences between said B samples and said A samples.

7. The method of claim 6 wherein said samples pass through the same shift register as an interlaced time series.